J. B. HANCOCK.
BEET LIFTING MACHINE.
APPLICATION FILED JAN. 29, 1916.

1,222,098.

Patented Apr. 10, 1917.
3 SHEETS—SHEET 3

WITNESSES

INVENTOR
James B. Hancock
BY
ATTORNEY

UNITED STATES PATENT OFFICE.

JAMES B. HANCOCK, OF CEDAREDGE, COLORADO.

BEET-LIFTING MACHINE.

1,222,098.      Specification of Letters Patent.      Patented Apr. 10, 1917.

Application filed January 29, 1916. Serial No. 75,142.

*To all whom it may concern:*

Be it known that I, JAMES B. HANCOCK, a citizen of the United States, residing at Cedaredge, in the county of Delta and State of Colorado, have invented certain new and useful Improvements in Beet-Lifting Machines, of which the following is a specification.

This invention relates to an improved beet lifting machine and the principal object of the invention is to provide a machine of the character described so constructed that after the tops have been removed, the beets may be lifted from the ground and thrown upon a conveying belt leading to a trough.

Another object of the invention is to provide improved means for adjustably mounting the digging plows.

Another object of the invention is to provide a machine of the character described which will be comparatively simple in construction and to further so construct it that it will be easy to adjust and operate.

This invention is illustrated in the accompanying drawings, wherein:—

Figure 1:
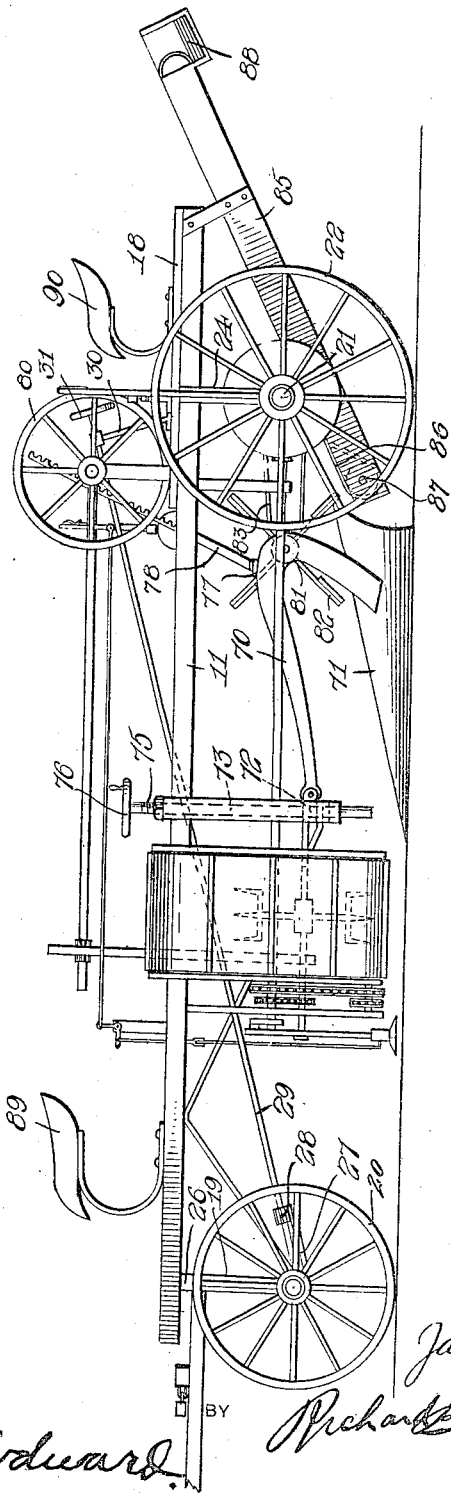
Figure 1 is a view showing the improved machine in side elevation.
Figure 2:
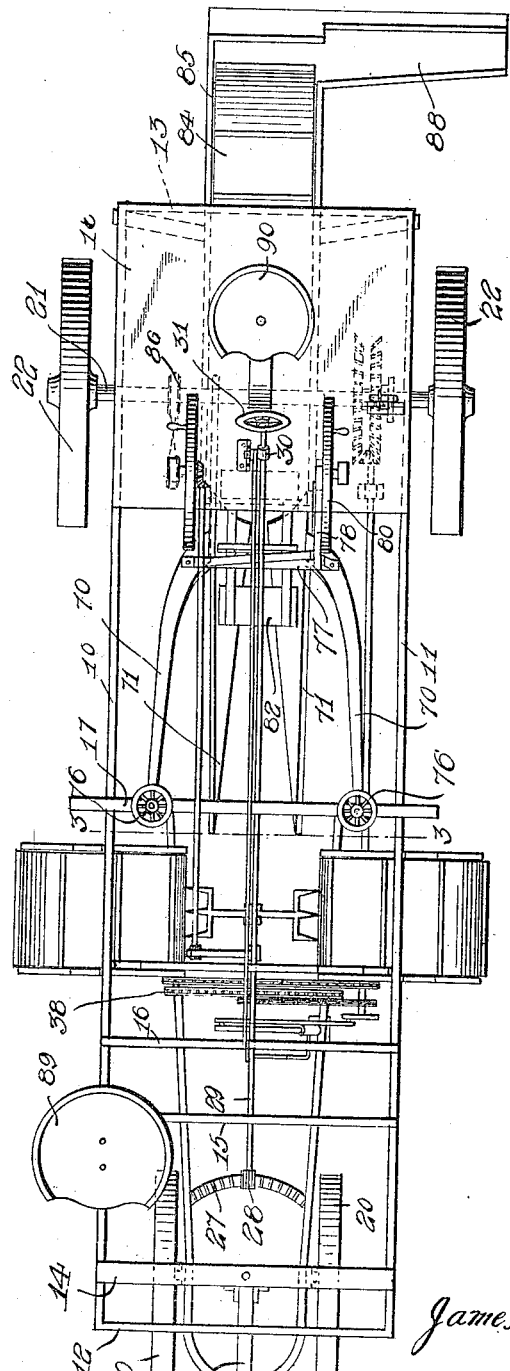
Fig. 2 is a view showing the improved machine in top plan.
Figure 3:
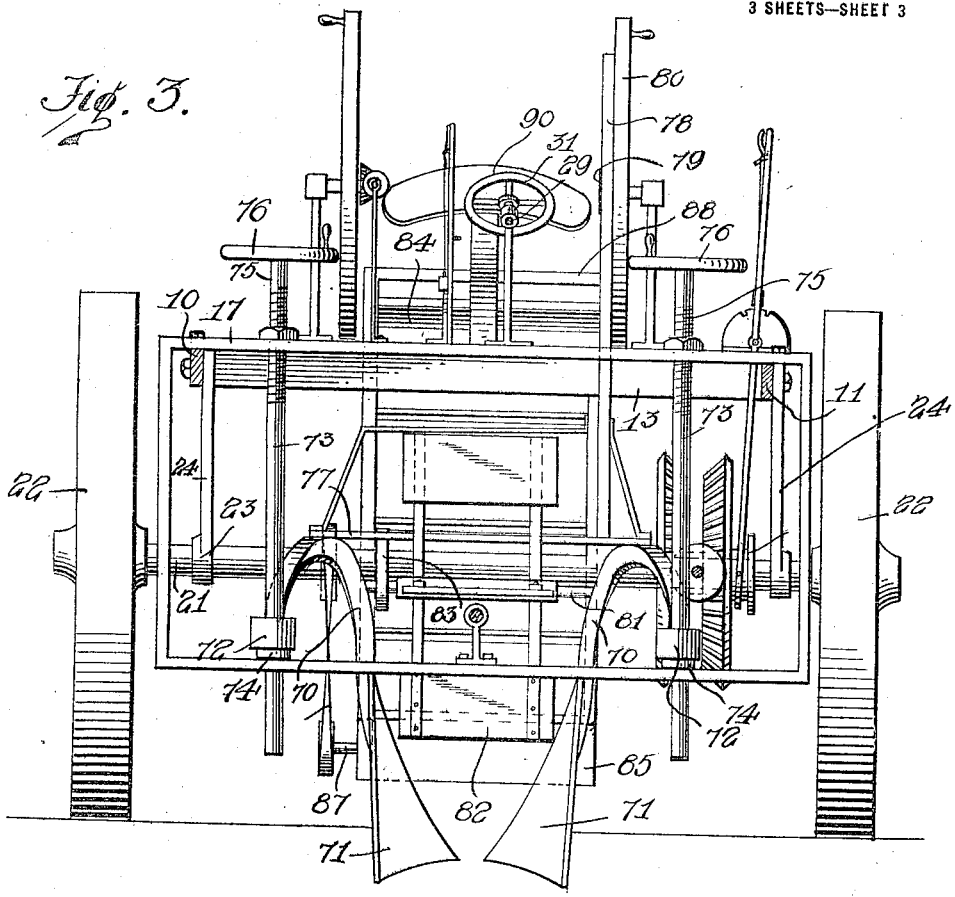
Fig. 3 is a transverse vertical sectional view through the machine, taken along the line 3—3 of Fig. 2.
Figure 4:
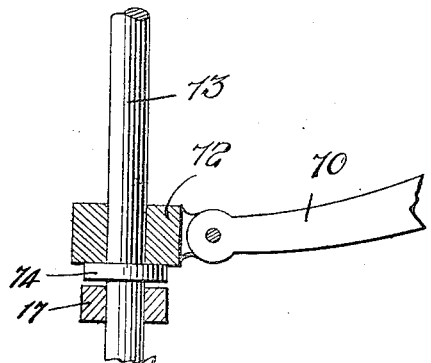
Fig. 4 is a fragmentary view showing the manner of connecting the plows with the supporting posts.

The frame of this machine is substantially rectangular and is provided with side bars 10 and 11 and front and end bars 12 and 13, cross bars 14, 15, 16 and 17 being carried by the side bars and a platform 18 being carried by the side bars and rear end bar. The front truck 19 which is provided with supporting wheels 20 is connected with the cross bar 14 and the rear or driving axle 21 which carries the supporting wheels 22 is mounted in the bearing 23 of the hanger brackets 24. It will thus be seen that this axle 21 will constitute the driving shaft for the machine. This forward truck 19 is provided with a tongue 25 connected with the cross bar 26 forming part of the forward truck and is also provided with a rack bar 27 engaged by gears 28 mounted upon the steering shaft 29. This steering shaft 29 extends rearwardly of the frame and is rearwardly mounted in the bearing bracket 30 so that if desired the front truck may be turned to guide the machine by turning the steering shaft or post 29 through the medium of the hand wheel 31. It is of course understood that it is not necessary to guide the machine with this steering shaft when horses are connected with the tongue 25, this steering mechanism being principally used if the machine is driven with an engine mounted upon the frame. This engine has not been shown as if desired any suitable type may be used.

The plow beams 70 which carry the lifting plows 71 are pivotally connected with the collars 72 mounted upon the adjusting posts 73. These adjusting posts 73 are provided with enlarged heads 74 to support the collars 72 and have their upper end portions threaded as shown at 75 so that by rotating the posts by means of the hand wheel 76, the forward end portions of the plow beams may be raised or lowered. The rear end portions of these plow beams are connected by a cross bar 77 carrying a rack bar 78 engaging the gear or pinion 79 of the hand wheel 80. By turning this hand wheel the rack bar 78 may be moved to raise or lower the rear end portions of the plow beams. There have therefore been provided means for adjusting both the forward and rear end portions of the plow beams so that the plow blades can dig into the ground the proper distance and at the same time assume the proper position.

The shaft 81 of the beater 82 is rotatably supported by the plow beams 70 adjacent the rear ends thereof and above the rear end portions of the plow blades 71 and carries a pulley wheel around which the belt 83 passes. This belt 83 passes around a pulley wheel mounted upon the driving axle or shaft 21 and therefore when the machine is in use the beater will be rotated to engage the beet roots and move the same onto the conveyer belt 84 traveling through the trough 85 and moved through the medium of the belt 86 passing around a pulley wheel mounted upon driving shaft 21 and the axle 87 of the lower roller for the belt 84. This trough 85 is provided with a branch 88 which if desired may carry a suitable receptacle for the beet roots or may permit the beet roots to drop upon the ground.

When this machine is in use, it is driven across the field with the plow blades 71 positioned upon opposite sides of the rows of beets and adjusted so that the blades will dig into the ground and by engaging the beet roots lift them out of the ground. The beet roots will be lifted from the ground, the plow blades being provided with convex beet engaging surfaces so that the roots will be dug and lifted without being bruised. The revolving sweep or beater 82 engages these roots and moves them rearwardly onto the lower end of the conveyer belt 84 which carries them up the trough 85 and deposits them in the branch 88, down which they will travel either into a suitable receptacle or if no receptacle is provided, the roots will drop out of the branch trough 88 onto the ground. It is preferred however to provide a suitable receptacle for the beet roots so that they will not be bruised or otherwise injured by dropping upon the ground. Seats 89 and 90 are provided, one for the driver and one for the operator.

What is claimed is:—

1. A beet digging machine including a frame, and digging means carried by said frame, said digging means including supporting posts mounted in said frame for vertical adjustment, plow beams, collars loosely mounted upon said posts and pivotally connected with said plow beams, heads upon said posts supporting said collars, means for vertically adjusting the rear end portions of said plow beams and releasably holding the same in an adjusted position, plow blades carried by said plow beams, a conveyer carried by said frame back of said plow blades, and means for moving beet roots from said plow blades onto said conveyer.

2. A beet digging machine including a frame, a conveyer carried by said frame, digging means in front of said conveyer, said digging means including plow beams, plow blades carried by said plow beams, a sweep positioned between said plow beams and having its axle journaled thereto, and means for rotating said sweep to move beets from said plow blades onto the conveyer.

3. A beet digging machine including a frame, a conveyer carried by said frame, plow beams mounted in said frame in spaced relation, plow blades carried by said plow beams, a shaft extending transversely between the rear end portions of said plow beams and rotatably supported thereby, a sweep mounted upon said shaft, and means for rotating said sweep to move beet roots from said plow blades onto said conveyer.

In testimony whereof I affix my signature in presence of two witnesses.

JAMES B. HANCOCK.

Witnesses:
 DORA P. HALL,
 CLYDE W. BREWER.

Copies of this patent may be obtained for five cents each, by addressing the "Commissioner of Patents, Washington, D. C."